United States Patent [19]

Takii

[11] 4,040,022
[45] Aug. 2, 1977

[54] MISSING CLOCK DETECTION CIRCUIT

[75] Inventor: Tomio Takii, Yokohoma, Japan

[73] Assignee: NCR Corporation, Dayton, Ohio

[21] Appl. No.: 647,221

[22] Filed: Jan. 7, 1976

[30] Foreign Application Priority Data

Feb. 21, 1975 Japan .................................. 50-21807

[51] Int. Cl.² ........................... G06F 1/00; G11B 5/02
[52] U.S. Cl. .......................................... 364/900; 360/51
[58] Field of Search ...................... 340/172.5, 167 R; 360/51; 328/109; 307/232, 208

[56] References Cited

U.S. PATENT DOCUMENTS

| | | | |
|---|---|---|---|
| 2,780,670 | 2/1957 | Brewster | 360/51 X |
| 3,405,391 | 10/1968 | Halfhill et al. | 340/167 R |
| 3,418,585 | 12/1968 | Harnett | 307/232 X |
| 3,641,526 | 2/1972 | Bailey et al. | 360/51 |
| 3,879,753 | 4/1975 | Dunn | 360/51 |

*Primary Examiner*—Raulfe B. Zache
*Attorney, Agent, or Firm*—J. T. Cavender; Wilbert Hawk, Jr.; Jeffrey P. Morris

[57] ABSTRACT

A circuit for detecting digital data recorded on a magnetic recording medium is disclosed wherein data is detected by detecting a missing clock and fixed data at the missing clock location. Clock and data pulses are interleaved on the recording medium and encoded to distinguish data and detecting the missing clock by encoding data corresponding to signal absence into the bit position adjacent to the last bit of the missed clock bit when such condition is present. The clock and data bits are detected from the decoded signal read from the recording medium by timing the first period between succeeding bits which is of greater time duration than the interval between succeeding clock and data bits but shorter than the interval between succeeding clock bits having a data bit interposed therebetween. A second timing means times the second period which is of greater time duration than the interval between two succeeding clock bits but shorter than the interval between a clock and data bit adjacent to the next clock bit. The times are then compared to determine whether a missing clock has occurred and a correction code is generated.

23 Claims, 4 Drawing Figures

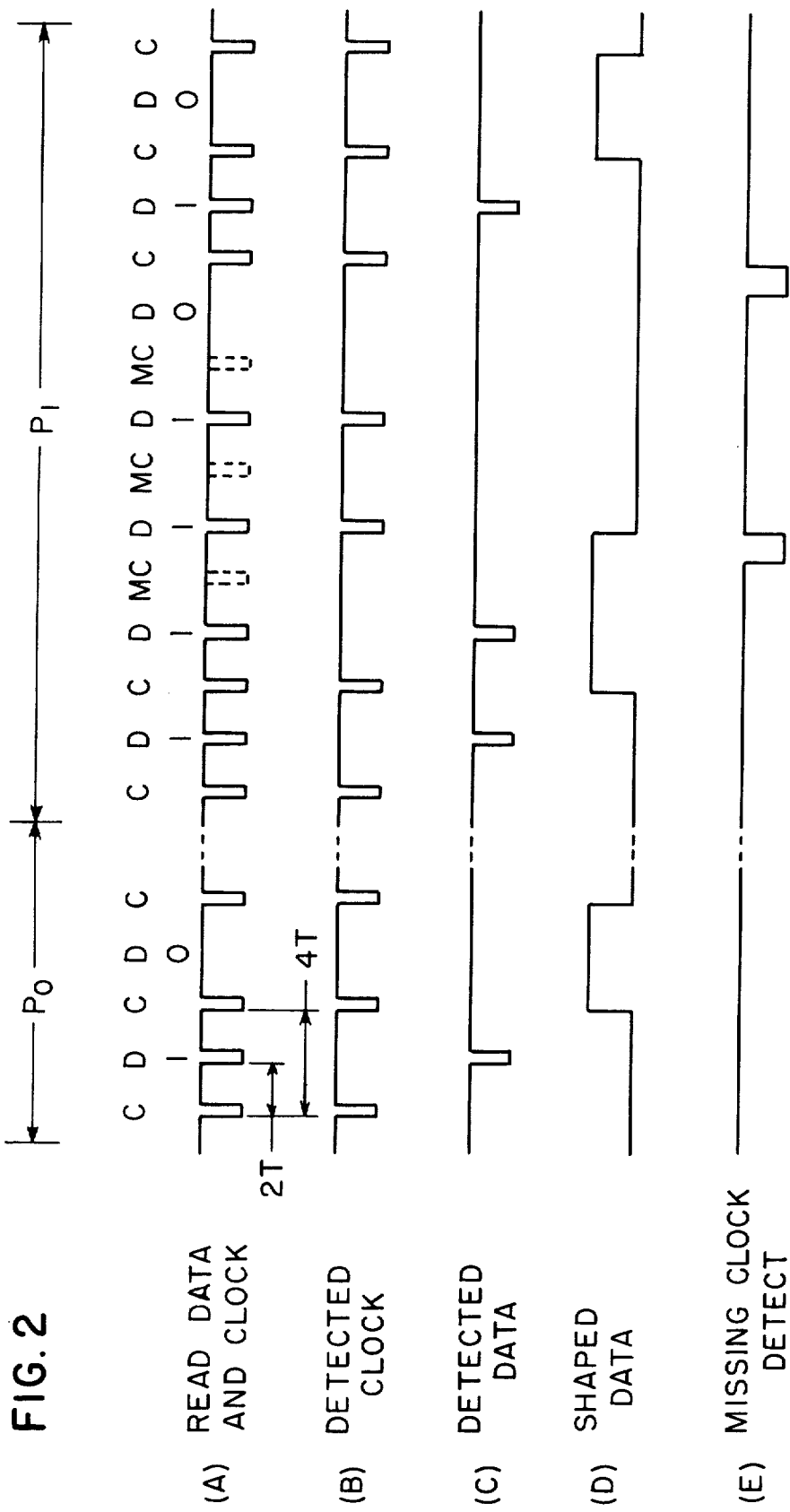

MISSING CLOCK DETECTION CIRCUIT

BACKGROUND OF THE INVENTION

1. Field of the Invention

The present invention relates generally to synchronization of data in a data processing system and more particularly to the detection of a missing clock pulse for accurate discrimination between clock and data signals by means of a simplified missing clock detection circuit.

In data processing equipment wherein data is recorded on a recording medium such as magnetic tape, drum or disc, it is generally known to detect missing clock pulses by means of complex circuitry such as a phase locked loop, which causes a variable frequency oscillator to synchronize with the clock while at the same time generating a pulse upon detection of the missing clock to compensate for such occurrence. The present invention inserts a digital code at the missing clock location to enable distinct locations of missing clocks to be recorded for later decoding.

2. Description of the Prior Art

Generally, in recording digital data onto or reading data from a recording medium, such as a magnetic disc, the relative position of the data on the recording medium must be accurately and rapidly determinable. One technique for recording data for accurate recovery is the recording alternately of clock and data bits on the medium. The phase locked loop detectors of the prior art, as previously mentioned, require both an internal oscillator and complex circuitry synchronizing the oscillator with the recorded clock.

U.S. Pat. No. 3,405,391 of the prior art describes a system for reading magnetically rocorded double frequency coded data with means for detecting and separating the clock bits from the data bits. In the present invention, data which indicates the position of data is discriminated from general recorded data in that it is recorded in the missing clock signal bit location. The delay circuitry of the referenced patent is not required by the present invention. Other prior art methods of data synchronization and missing bit detection are disclosed by U.S. Pat. Nos. 3,641,526; 3,418,585; 3,382,492; and 2,780,670.

SUMMARY OF THE INVENTION

Missing clock pulses are detected in accordance with the present invention by a detection circuit for reading encoded data including a timer for measuring a first time or period which is of greater duration than the period between a clock bit and a succeeding data bit, but of less duration than the period between two succeeding clock bits having a data bit interposed therebetween; and after which period the timer is stopped. A second timer measures a second period which is of greater duration than the period between two succeeding clock bits but shorter than the period between a clock bit and a data bit which appears after the next clock bit, at the conclusion of which second period the second timer is stopped. In the normal state, i.e., when no clock signal is missing, the first timer continuously measures the time period as each clock pulse is received. When a signal is received within the first period after detection of a clock pulse, the signal is decoded as a data signal. Conversely, when a signal is received after the conclusion of the first measured period after the decoding of a clock pulse, the signal is decoded as a clock signal. In this manner, clock and data pulses are separated. The second timer continuously measures the period between detected clock signals. A missing clock is considered detected when, after detection of a first clock pulse, the next clock pulse is not detected within the second period. Upon this occurrence, and when a data bit signal indicative of a digital "one" is detected after the missing of one or more succeeding clock pulses, the data bit signal is decoded as a clock signal, as it has been decoded following the conclusion of the first time period after the detection of the clock signal and immediately preceding the missing of a clock pulse. Thus, a "false" decoding of clock and data signals is caused to occur. However, this false decoding is corrected when a new clock pulse is detected immediately following the period during which the clock pulse is missing. Further in accordance with the present invention, when data is encoded, a data signal indicative of "signal absence", or bit zero is inserted immediately following the last missing clock bit to correct the false decoding. Of course, "signal presence" is indicated by a logical one. The correction occurs because the period between a missing clock pulse and a clock pulse immediately following the missing clock pulse is of greater time duration than the first period; hence, the first clock pulse occurring after the missing clock pulse is decoded as a clock signal. When clock bits are cancelled to insert a code representative of the position of data, such as by a succession of logical ones within the missing clock period, the decoded signal representative of the detection of a missing clock is a fixed data pattern, which distinguishes this detection from the instance in which clock pulses are missed by error. Such a code of logical ones or zeros may be inserted both before and after the missing clock pulse when desired.

It is therefore an object of the invention to detect missing clock signals (herein used interchangeably with missing clock bits and missing clock pulses) and to detect data inserted into the period within which such clock signals are missing, by means of a simple circuit.

Another object of invention is the provision of a system for detecting missing clock signals which distinguishes clock pulses from data pulses wherein such detection is accomplished by a simple and economical circuit.

Yet another object of the invention is the provision of a circuit for detecting missing clock pulses which is capable of discriminating a clock signal from a data signal and detecting the missing clock pulses by means of simple timing circuits, which utilize a false decoding between the data and clock signals during the period during which a missing clock occurs, and correcting such false decoding by the insertion of a unique data signal into the period immediately following the last missing clock signal.

The foregoing and other objects, features and advantages of the invention are described in greater detail with reference to the following description of a preferred embodiment thereof, taken in connection with the following drawings wherein:

BRIEF DESCRIPTION OF THE DRAWINGS

FIGS. 2(A) through 2(E) are waveform diagrams illustrative of the operation of the circuit described with reference to FIG. 1.

DESCRIPTION OF THE PREFERRED EMBODIMENT

Figure 1:
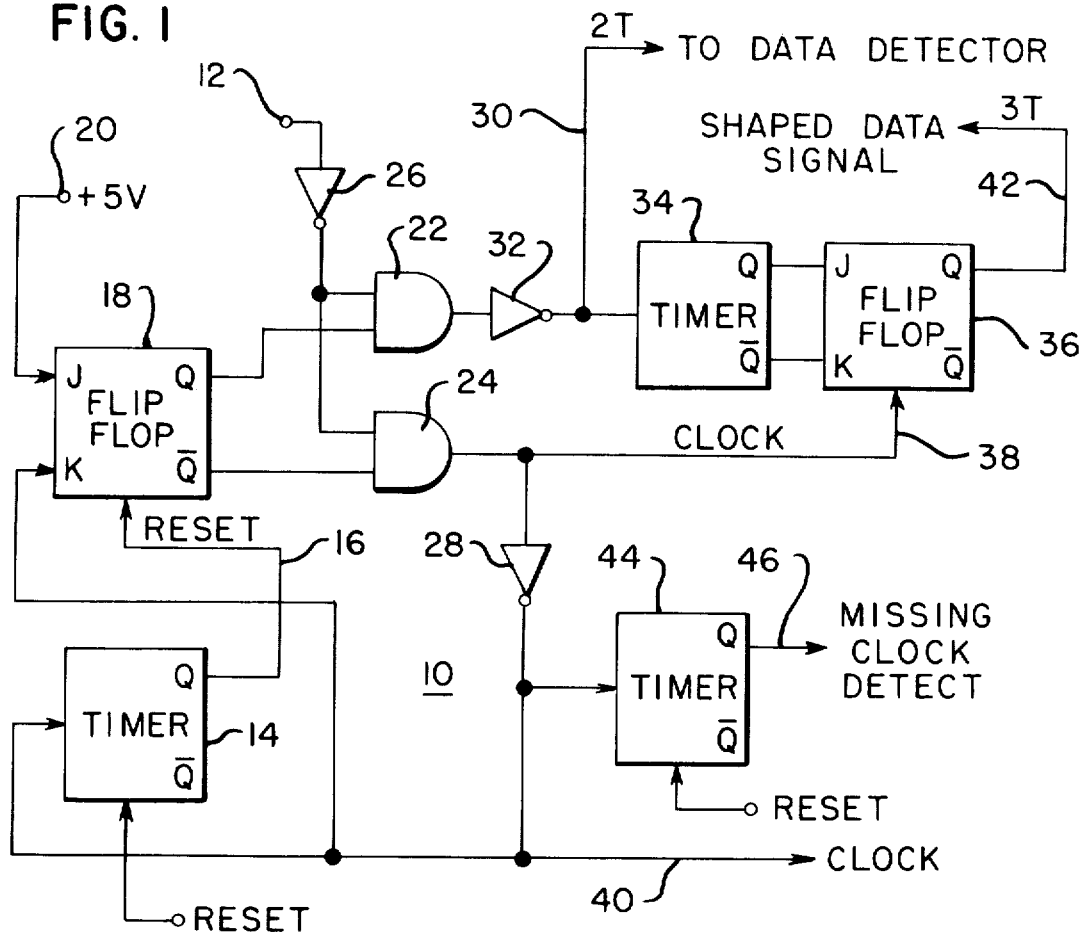
FIG. 1 is a missing clock detection circuit in accordance with the invention.

Referring now to FIGS. 1 and 2, a missing clock detection circuit is illustrated generally at 10. Digital data, in NRZI, manchester or in any encoded format is applied at data input 12, after reading thereof from magnetic disc or tape or other known data storage or recording media. The applied data input at terminal 12 includes clock bits alternately encoded with the data, and illustrated by waveform 2(A) wherein "C" represents clock bits, "D" represents data bits, and, as will be described, "MC" represents a missing clock bit. When no missing clock signal is present, the clock and data bits are detected alternately and at equal time intervals as illustrated by the portion $P_o$ of waveform 2(A), in which portion $P_o$ the time interval between succeeding clock or data bits is 4T while the time interval between a clock bit and the next succeeding data bit is 2T. Logical "one" data bits represent a data signal presence while logical "zero" data bits represent a signal absence. Thus, a data signal representative of a logical "one" has a waveform identical to that of a clock signal.

With no clock signal missing, a timer circuit 14, which may comprise a latch, having a period between set and reset of 3T, and which timer circuit is reset prior to the arrival of a clock bit. The noninverted data output 16 of timer circuit 14, representative of signal absence, or zero is coupled to the reset input of a JK flip-flop 18, having the logic level "one" applied to the other input 20 thereof. Upon the arrival of a clock bit at terminal 12, the noninverted output (Q) of flip-flop 18 is "0" while the inverted output (Q) is "1", which results in AND gate 22 being OFF and AND gate 24 being ON. The incoming clock bits are inverted in polarity by an inverter 26, are coupled through AND gate 24 and applied as the trigger input to timer circuit 14 after inverting by inverter 28, causing the output of timer circuit 14 to change from zero to one for a time duration equal to 3T, after which period timer circuit 14 is reset to zero. The change in output to "one" of timer circuit 14 causes the reset input 16 of flip-flop 18 to go positive (one). The negative input of flip-flop 18 has coupled thereto the inverted output of AND gate 24, causing the flip-flop to switch at the end of the clock pulse, which in turn turns AND gate 22 ON and AND gate 24 OFF. Any pulse arriving subsequent to a period of 2T from the arrival of a clock pule is coupled to a data detector via line 30 from flip-flop 18 via AND gate 22 and inverter 32. After the elapse of a period equal to 3T from the arrival of a clock pulse, timer circuit 14 is reset, flip-flop 18 is reset and the circuit is ready to repeat the aforedescribed operation upon the arrival of the next clock pulse.

Another timer circuit 34, which may also comprise a latch, has a period of 3T between set and reset and has coupled to the input thereof the data output of inverter 32. The noninverted (Q) and inverted (Q) outputs of timer circuit 34 are coupled to the positive and negative inputs respectively of a JK flip-flop 36. Flip-flop 36 is clocked by the output of AND gate 24 via line 38. Operationally, timer circuit 34 expands the data detection output of AND gate 22 to a period of 3T and couples out the same as a shaped data signal on line 42 synchronized to the detected clock by flip-flop 36.

Referring to FIGS. 2(A) through 2(D), waveform 2(A) is coupled to line 12 as previously mentioned, while the inverted output of AND gate 24 on line 40 is illustrated by waveform 2(B). The inverted detected data on line 30 from AND gate 22 is illustrated by waveform 2(C). The shaped data output on line 42 is illustrated by FIG. 2(D). As aforementioned, those waveforms included within period $P_o$ are present when the clock is present.

The operation of the circuit of FIG. 1 will now be described for the case in which clock pulses are missing and data position pulses are inserted in the place of such missing clock pulses. Assuming that a clock pulse is not detected, for whatever reason, defined herein as a "missing clock", after a period of 4T from the arrival of the last clock pulse, and further assuming a logical one in the bit position of the next data bit following the location of the missing clock bit, a time duration of 6T will have elapsed from the arrival of such last detected clock bit immediately preceding the missing clock bit to the arrival of the data logical one bit. The missing clock bit is detected as follows. Another timer circuit, 44, which may comprise a latch having a period of 5T between set and reset, has coupled to the input thereof the inverted output of AND gate 24 (waveform 2B). Timer circuit 44 is set by the detected clock from AND gate 24 and reset after a time duration of 5T when no further trigger (set pulse) is applied during the 5T period. When the clock is present (no missing clock condition), timer 44 is set by the arrival of each succeeding clock pulse; hence, under such condition, timer circuit 44 is never reset. Such reset occurs only when the clock input is missed.

Upon coupling of a logical one data bit to line 12 before the termination of the period during which the clock signal is missed, such data bit is utilized as a clock bit, since timer circuit 14 and flip-flop 18 are in reset condition at this time. The data bit is decoded as a clock bit during the missing clock period. At this point, a constant data signal, i.e., an "all ones" signal may be inserted into the missing clock interval. Since the clock and data waveforms and the missing clock detection code are repetitive, i.e., constant, the particular missing clock pulse is detected by the decoding of the inserted code, i.e., the data position indicating "all ones" signal, which signal is readily distinguishable from the rest of the data train.

Distinction between the above-described detecting of a data position indicating code from the missing of a clock pulse due to error, bit shift, etc. may also be accomplished. To correct the decoding of data bits as clock bits at the end of a missing clock period, a data bit (logical zero) is inserted into the bit position adjacent to the last position of the missing clock period. Thus, the interval immediately following the arrival of a data signal which is decoded as a clock signal until the arrival of the next clock bit following the missing clock period, has an interval time duration in excess of 4T. Thus, the first clock bit after the missing clock interval coupled to line 12 causes timer circuit 14, which is in the reset state, to detect the clock bit. When only a single pulse is missed, the aforedescribed technique of insertion of a logical zero into the bit position immediately succeeding the missing clock pule is utilized to correct the decoding of data bits as clock bits.

The detected data, shaped data, detected clock and the missing clock position data code may be coupled to any well known central processor, such as a minicomputer, for final decoding and, detection of the missing clock and discrimination between the originally encoded data and the inserted data position code. The operation of such processors is well known and does not form a part of the present invention.

With reference again to FIG. 2, the period $P_1$ of waveforms 2(A) through 2(E) is illustrative of the aforedescribed case in which missing clocks occur and a data position indicating code is inserted therefor. The detection of such missing clock is illustrated by waveform 2(E), which waveform is the output of timer circuit 44 on line 46.

Figure 3:
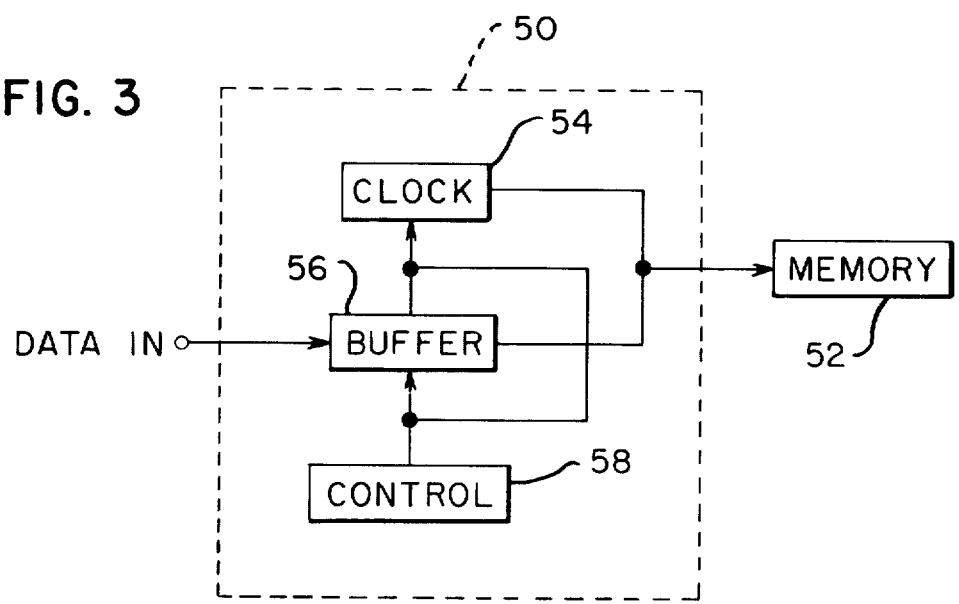
FIG. 3 is a block diagram of a data storage for data derived from the circuit described with reference to FIG. 1.

Referring now to FIG. 3, a simplified block diagram of a data encoder for writing data into storage in the presence of a missing clock condition. A data transmission or coupling unit 50, which may, for example, comprise a programmed microprocessor or minicomputer, includes a local memory 52 capable of recording and storing of data coupled thereto. When the clock is continuously present (no missing clock condition) clock and data bits are alternately coupled to and written into the memory 52. Such clock pulses may be derived from any known clock source, illustrated by clock source 54. The data bits, derived from the data output of FIG. 1 or from other data sources is coupled to any buffer capable of transmitting data, such as a shift register, illustrated by buffer 56.

During the insertion of a data position indicating code into the data stream, the data coupled from buffer 56 is stopped for a sufficient time duration by a write control circuit 58, which may comprise an electronic switch or any other means for turning OFF the data output of buffer 56 for a predetermined time at the missing clock positions by stopping the clock 54. A logical zero is then inserted into the bit stream from buffer 56 following the missing clock location, as previously described, or such other code as may be desired. Of course, other, externally generated data may be stored together with the missing clockk signal at the missing clock location.

While the invention has been particularly shown and described with reference to a preferred embodiment thereof, it will be understood by those skilled in the art that the foregoing and other changes in form and detail may be made thereto without departing from the spirit and scope of the invention.

What is claimed is:

1. In a data processing system wherein data bits and clock bits are serially and alternately encoded, a missing clock pulse detector comprising:
   input means for receiving said data bits and said clock bits;
   first means coupled to said input means for establishing a first time period of greater duration than the interval between succeeding clock and data bits and of less duration than the interval between said succeeding clock bits having a data bit interposed therebetween;
   second means coupled to said input means for establishing a second time period of greater duration than the interval between said succeeding clock bits and of less duration than the interval between the first of said succeeding clock bits and the data bit adjacent to the second of said succeeding clock bits;
   means including said second means for detecting the occurrence of a missing clock bit; and
   means responsive to the detection of a missing clock bit for decoding the next bit following the missing clock bit as either a data bit or a clock bit depending upon whether said next bit is detected within said first or said second time period.

2. In a data processing system in accordance with claim 1, a missing clock pulse detector further comprising means coupled to said means for decoding the next bit following the missing clock bit for inserting one or more predetermined data into at least the next position in time adjacent to the position of said missing clock bit.

3. In a data processing system in accordance with claim 2, a missing clock pulse detector wherein said inserted predetermined data bits comprises a one-bit correction code.

4. In a data processing system in accordance with claim 2, a missing clock pulse detector wherein said inserted predetermined data bits comprises a multi-bit correction code.

5. In a data processing system in accordance with claim 1, a missing clock pulse detector wherein said means for decoding the next bit following the missing clock bit includes means for determining whether said next bit is received before or after said first period such that said next bit is decoded as a clock bit when said missing clock is detected and said second period has elapsed.

6. In a data processing system in accordance with claim 1, a missing clock pulse detector wherein said first time period is indicative of the time following the detection of each clock bit and wherein said next bit received within said first time period after receiving said clock bit is decoded as a data bit and a bit received after the end of said first time period is decoded as a clock bit; and
   wherein said second time period is indicative of the time duration after each clock bit is received such that missing clock bit is indicated when the next clock bit is not received within said second period.

7. In a data processing system in accordance with claim 1, a missing clock pulse detector wherein said means for establishing said first time period and said means for establishing said second time period comprise first and second timer circuits respectively.

8. In a data processing system in accordance with claim 1, a missing clock pulse detector wherein said alternately encoded clock and data bits are encoded on a magnetic media.

9. In a data processing system in accordance with claim 1, a missing clock pulse detector wherein said means for detecting a missing clock comprises a timer circuit for generating a pulse upon the detection of a missing clock bit.

10. A missing clock pulse detection circuit for detecting the non-occurrence of a clock bit in a serial bit-stream of alternately encoded clock and data bits comprising:
   first and second AND gates each having a pair of input terminals, said bit-stream being coupled to one of said input terminals of each of said AND gates;
   a first timer circuit having a period longer than the interval between succeeding clock and data bits and shorter than the interval between succeeding clock bits with a data bit interposed therebetween;
   a first flip-flop having an inverted output coupled to the other input terminal of said first AND gate and a noninverted output coupled to the other input terminal of said second AND gate, and having an input corresponding to the output of said first AND gate, said first AND gate output also being coupled to the set input of said first timer circuit, the output of said first timer circuit being coupled to the reset terminal of said first flip-flop;

a second timer circuit having a second period which is the same as the period of said first timer circuit, and having an input corresponding to the output of the second AND gate, and wherein said second timer circuit has at least one output coupled therefrom; and a second flip-flop having the output of said second timer circuit coupled to the data input thereof and the output of said first AND gate coupled to the clock input of said second flip-flop, and wherein said second flip-flop has a data output.

11. A missing clock pulse detection circuit in accordance with claim 10 further comprising:

a missing clock detection timer circuit having as the input thereof the clock input to said second flip-flop, and an output indicative of the detection of a missing clock pulse.

12. A missing clock pulse detection circuit in accordance with claim 11 further comprising:

means coupled to said data output of said second flip-flop, said first and second AND gate outputs and said output of said missing clock detection timer circuit for inserting an error correction code into the bit stream immediately adjacent in time to the detected missing clock bit location.

13. A missing clock detector comprising:

a source of serially and alternately encoded clock and data bits;

means for detecting said clock and data bits, including means for detecting the occurrence of one or more missing clock bits comprising a first timer circuit for detecting a first time period of greater duration than the time period between succeeding clock and data bits and less duration than the timer period between succeeding clock bits having a data bit interposed therebetween; a second timer circuit for detecting a second time preiod of greater duration than the time period between two succeeding clock bits and of less duration than the time period between one clock and data bit adjacent to the immediate succeeding clock bit;

and means responsive to said first and second timer circuits for decoding the next bit following the missing clock as either a data or a clock bit.

14. A missing clock detector in accordance with claim 13 wherein said decoding means comprises a logic circuit for determining whether said next bit is received before or after said first period such that said next bit is decoded as a clock bit when said missing clock is detected and when said second period has elapsed.

15. A missing clock detector in accordance with claim 13 further comprising means coupled to said means for decoding and to said second timer circuit responsive to the detection of the missing clock bit for inserting a predetermined correction code into the next position in time adjacent to the position of the said missing clock bit.

16. A missing clock detector in accordance with claim 13 wherein said first timer circuit measures the time following the detection of each clock bit, such that the next bit received within said first period after the clock bit, is decoded as a data bit and a bit received after the end of said first period is decoded as a clock bit; and said second timer circuit measures the time after each clock bit and decodes a missing clock bit as having occurred when the next clock bit is not detected within said second period.

17. A missing clock detector comprising:

a source of serially and alternating encoded clock and data bits;

means for detecting said clock and data bits;

means reponsive to said detecting means for detecting one or more missing clock bits including, means for establishing a first time period of greater duration than the interval between succeeding clock and data bits and of less duration than the interval between succeeding clock bits having a data bit interposed therebetween; means for establishing a second time period of greater duration than the interval between succeeding clock bits and of less duration that the interval between one of said clock bits and a data bit adjacent to the immediately following clock bit; and logic means responsive to the detection of said missing clock bit for decoding the next bit following the missing clock as a data bit or clock bit in accordance with the decoding of said next bit in either said first or said second time period.

18. A missing clock detector in accordance with claim 17, further comprising:

means for correcting the decoding of a data bit as a clock bit upon the occurrence of the next clock bit following the missing of said clock bit occurrence when said data bit immediately following the occurrence of said missing clock bit is decoded as a clock bit.

19. A signal processing circuit for decoding a signal waveform containing clock signals interleaved with data signals comprising:

input means for receiving said signal waveform;

first and second gates, with said input means including means for applying said signal waveform to an input of each of said first and second gates, and with said first gate having an output coupled to a utilization circuit;

first and second timers, with said second gate having an output coupled to said first and said second timers, said first timer having a pair of complementary outputs coupled respectively to said first gate and said second gate, said first timer being operable to reverse signals present on said complementary outputs for a first predetermined time period in response to a signal on the output of said second gate, said second timer being operable to provide an output signal in response to the time interval between successive signals on the output of said second gate being greater than a second predetermined time period, said signal processing circuit being operable whereby each clock signal is effective to cause a signal to appear on the output of said second gate, and said second timer is effective to provide an output indication signal in the event of a clock signal being missing from between two adjacent data signals.

20. A signal processing circuit in accordance with claim 19, wherein said first timer includes a flip-flop having true and false outputs coupled to said first and second gates respectively, and a timer circuit, a signal appearing on the output of said second gate being effective to set said flip-flop from a first to a second state, and to initiate operation of said timer circuit, said flip-flop being reset from said second to said first state after said first predetermined time period has elapsed.

21. A signal processing circuit in accordance with claim 20, wherein said second timer includes a timing circuit operable to be set from a first to a second state in response to a signal on the output of said second gate and to be reset from said second to said first state in the absence of a signal on the output of said second gate during said second predetermined time period, thereby providing said output indication signal on an output of said timing circuit.

22. A signal processing circuit in accordance with claim 19, wherein said clock signals are in the form of clock pulses, wherein said data signals are in the form of the presence or absence of a data pulse, and wherein said signal waveform includes a data location signal including the absence of a clock pulse at a clock pulse time followed by the presence of a data pulse, which data pulse is effective to cause a signal to appear on the output of said second gate.

23. A signal processing circuit in accordance with claim 22, wherein said data location signal further includes the absence of a clock pulse at a further clock pulse time followed by the absence of a data pulse, whereby the pulse at the clock pulse time next after said further clock pulse time is effective to cause a signal to appear on the output of said second gate.

* * * * *